United States Patent [19]

Sipin

[11] Patent Number: 4,559,833
[45] Date of Patent: Dec. 24, 1985

[54] METER FOR MEASURING MASS FLOW RATE

[75] Inventor: Anatole J. Sipin, New York, N.Y.

[73] Assignee: Smith Meter Inc., Erie, Pa.

[21] Appl. No.: 655,305

[22] Filed: Sep. 26, 1984

Related U.S. Application Data

[63] Continuation of Ser. No. 428,736, Sep. 30, 1982, abandoned.

[51] Int. Cl.$^4$ .............................................. G01F 1/84
[52] U.S. Cl. .................................................. 73/861.38
[58] Field of Search ......................... 73/861.37, 861.38

[56] References Cited

U.S. PATENT DOCUMENTS

| Re. 31,450 | 11/1983 | Smith | 73/861.38 |
|---|---|---|---|
| 3,485,098 | 12/1969 | Sipin | 73/861.38 |
| 3,927,565 | 12/1975 | Pavlin et al. | 73/861.37 |
| 4,109,524 | 8/1978 | Smith | |
| 4,127,028 | 11/1978 | Cox et al. | |
| 4,187,721 | 2/1980 | Smith | 73/861.38 |
| 4,192,184 | 3/1980 | Cox et al. | 73/194 B |
| 4,252,028 | 2/1981 | Smith et al. | 73/861.38 |
| 4,311,054 | 1/1982 | Cox et al. | 73/861.38 |
| 4,381,680 | 5/1983 | Shiota | 73/861.38 |
| 4,422,338 | 12/1983 | Smith | 73/861.38 |
| 4,444,059 | 4/1984 | Smith | 73/861.38 |
| 4,491,025 | 1/1985 | Smith et al. | 73/861.38 |

Primary Examiner—Herbert Goldstein
Attorney, Agent, or Firm—Andrew J. Cornelius

[57] ABSTRACT

A dynamic type of mass flowmeter is disclosed in which an S-shaped conduit with supported ends is vibrated in a direction transverse to the plane of the conduit, and the force couple about an axis orthogonal to the longitudinal axis of the S-shaped conduit and also to the direction of vibration is sensed as a measure of the mass flow rate through the conduit.

12 Claims, 10 Drawing Figures

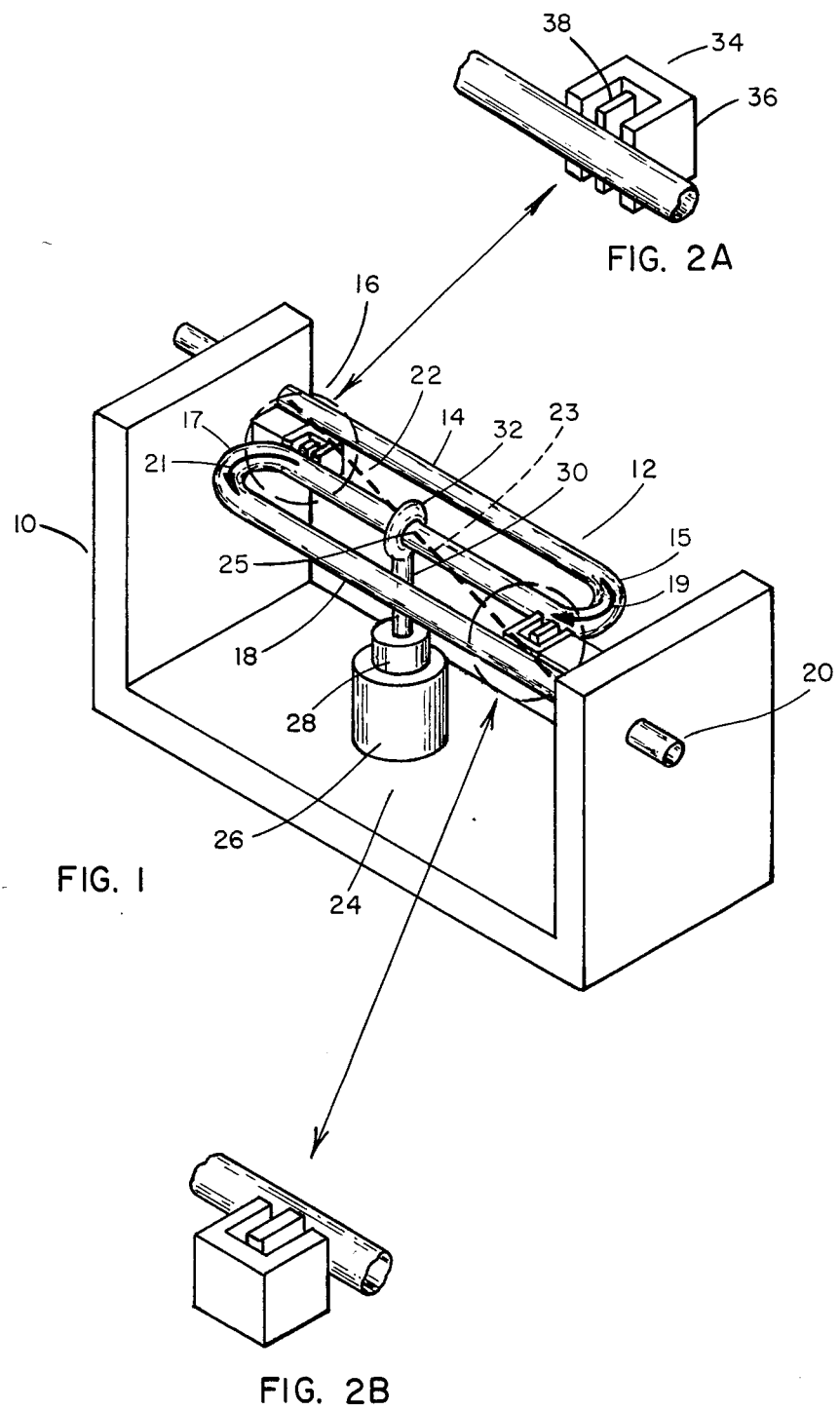

TOP VIEW

VIEW "AA"

VIEW "B-B"

SECTION "A-A"

METER FOR MEASURING MASS FLOW RATE

CROSS REFERENCE TO RELATED APPLICATIONS

This is a continuation of application Ser. No. 428,736 filed on Sept. 30, 1982, now abandoned.

BACKGROUND OF THE INVENTION

1. Field of the Invention

The present invention relates to a meter for measuring mass flow rate and, in particular, to a meter for measuring mass flow rate by vibrating a conduit that carries the material whose flow rate is being measured.

2. Description of the Prior Art

This invention relates to a dynamic vibratory meter for measuring the mass of material flowing therethrough, including liquids, gases, slurries and other fluent material, and in particular where the measurement is accomplished by vibration of an unobstructed conduit. The major advantages of such meters are that they measure the mass flow rate directly and that the conduit need not contain any moving parts or other obstructions. Such meters are particularly useful in the food and chemical process industries. They can also find application in metering highly compressed or liquified gases.

Various meters have been described in the past 35 years that measure mass flow rate by the transverse vibration of some form of conduit, including discontinuous tubes. The most pertinent art prior to this invention known to the applicant that involves continuous tubes is: Roth, U.S. Pat. No. 2,865,201; Sipin, U.S. Pat. No. 3,329,019; Sipin, U.S. Pat. No. 3,355,944; Cox et al., U.S. Pat. No. 4,127,028; Smith, U.S. Pat. No. 4,187,721 and Smith, U.S. Pat. No. 4,252,028.

Roth shows a gyroscopic mass flow meter in which fluid flows through a circular conduit of approximately 360°, as an analog of a rotating gyroscope wheel, which is oscillated about a central axis.

In U.S. Pat. No. 3,329,019, Sipin shows a single straight conduit which is flexed under a forced transverse vibration and the torque exerted by the conduit about a torque axis orthogonal to both the flow path and the direction of vibration is sensed as an indication of mass flow rate. This torque is produced by opposing transverse forces in the inlet and outlet sections of the conduit produced by transverse vibration of the mass flow.

Since the transverse vibrational velocity due to flexure of a straight tube can be limited, Sipin, in U.S. Pat. No. 3,355,944 shows the vibration of a curved tube in order to increase the vibrational velocity and the magnitude of the force couple. The orthogonal relationships among torque, vibration and flow are the same as for the straight tube. The tube is limited to a bend of 180 degrees or less to minimize or eliminate reversals in flow direction. Cox et al. show two parallel U-shaped tubes having the same fluid flow through both of them and vibrating in opposite directions. Differential motion is sensed as an indication of mass flow rate. The inlet and outlet are parallel and clamped in a support, the fluid flowing in opposite directions through them. The U-shaped tubes contain bent portions said to increase the Coriolis force moment arms.

In U.S. Pat. No. 4,187,721 Smith shows a U-shaped conduit mounted in a cantilevered manner with the conduit oscillating means mounted on a separate arm having a natural frequency substantially that of the U-shaped tube. The inlet and outlet are also parallel and clamped in a support, the fluid flowing in opposite direction through them.

In U.S. Pat. No. 4,252,028 Smith shows multiple parallel U-tubes oscillated together to measure combined flow of more than one fluid stream.

SUMMARY OF THE INVENTION

The present invention is a dynamic type of mass flowmeter in which a conduit with supported ends is vibrated in a direction transverse to the plane of the conduit, and the force couple about an axis orthogonal to the longitudinal axis of the conduit and also to the direction of vibration is sensed as a measure of the mass flow rate through the conduit.

It should be appreciated that the present invention, as also the prior art cited, is based fundamentally on the fact that a moving particle subjected to a transverse velocity gradient experiences a transverse froce related to the change in transverse momentum. This principle is clearly described for the case of a vibrated straight tube by Sipin in U.S. Pat. No. 3,329,019. Considering a straight section of tube with a longitudinal axis (X-axis) and fixed ends and vibrated along an axis (Z-axis) transverse to the X-axis, the force on an elementary particle travelling within the tube along the X-axis, due to its transverse motion can be expressed as $F_m = d(m\ V_z)/dt$, where m is the mass of the elementary particle and $V_z$ is the transverse vibrational velocity along the Z-axis. The equation can also be expressed as: $F_m = mV_x(d\ V_z)/dx$ where $V_x$ is the flow velocity along the X-axis, and $(dV_z)/dx$ the transverse velocity gradient along the X-axis. Assuming that the point of maximum transverse vibrational velocity is the mid-point of the tube, this force is directed in the positive Z direction between the inlet end of the tube and its mid-point, representing the inertial reaction of the particle to acceleration in the Z direction by the tube wall. The force is directed in the negative Z direction between the mid-point and the outlet end of the tube, representing the force exerted on the tube wall by the particle due to deceleration in the Z direction. The integrated reaction force due to acceleration of all the fluid particles between the tube entrance and its mid-point can be expressed as $F_{MU} = MZ_m$, where M is mass flow rate and $Z_m$ the transverse fixed entrance of the tube to a point of maximum velocity and a decreasing transverse velocity gradient from the maximum point to the fixed outlet, there will be a transverse force gradient in one direction from the inlet to the maximum point, and a transverse force gradient in the opposite direction from the maximum point to the outlet. For the S-shaped conduit, as for any bent conduit, there will be force couples in both the X and Y directions. These can be sensed directly, as by load cells at the mounts or, for a flexing conduit, by detecting differential deflection through motion sensors on both sides of the maximum velocity point as a measure of mass flow rate.

In all of the mass flowmeters of the prior art that has been cited, in which a bent or curved conduit is vibrated, the size of the diameter, width, or offset of the curved conduit required to obtain high sensitivity of measurement can cause excessive size of the meter and an undesirable envelope for installation in a line. The gyroscopic mass flowmeter of Roth has a full loop with a large ratio of loop diameter to conduit diameter; it would require considerable space and would be awkward to install in a line. The meter described by Sipin in U.S. Pat. No. 3,355,944, although capable of in-line connection, in its limit has a U-tube offset from the line that could require a considerable lateral distance from the line. The U-tube meters shown by Cox and Smith appear to have very high ratios of loop length to conduit diameter. They also appear to be designed to be installed at favorable locations, with the line being specially led to the meter. This undesirable, particularly where there is an existing line. If they are installed into an existing line, there would be a large lateral extension or elaborate plumbing, both undesirable.

The improvement provided by the present invention is due to the shape of the conduit, which permits ease of installation into a line. Normally, far more room is available for installation longitudinally, along the line, than laterally. It is possible to supply an S-shaped conduit with long legs that provide greater metering forces to increase sensitivity, increased flexibility of the conduit and lower power requirements and greater compactness, particularly in the lateral direction in a mass flowmeter that can be installed directly in a line.

BRIEF DESCRIPTION OF THE DRAWINGS

The following detailed description of the preferred embodiments can be understood better if reference is made to the drawings, in which:

FIG. 1 is an illustration of a preferred embodiment of the invention, showing the S-shaped flow measuring conduit.

FIGS. 2A and 2B are enlarged views of typical optical motion sensors.

DETAILED DESCRIPTION OF THE PREFERRED EMBODIMENTS

Figure 4:
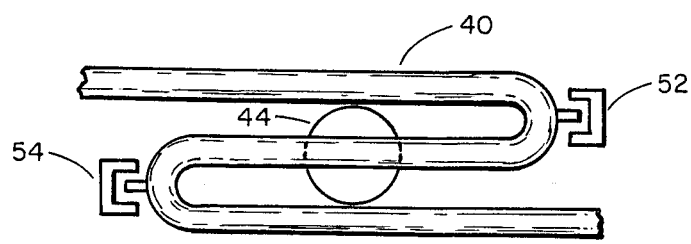
FIG. 4 is a top view of the structure shown in FIG. 3.

Referring now to FIG. 1, the vibratory mass flowmeter includes a support, 10, and an S-shaped conduit, 12, to contain a mass of fluent material. The conduit consists of three co-planar legs, and inlet leg, 14, connected to the support at its inlet end, 16, an outlet leg, 18, connected to the support at its outlet end, 20, and a return leg, 22, connecting the inlet leg 14 and outlet leg 18. Conduit 12 includes a first bend 15 that causes a fluid stream flowing through said conduit to make a turn in the direction shown by arrow 19, and a second bend 17 that causes the fluid stream to make a turn in a different direction shown by arrow 12. Conduit 12 crosses line 23, which joins the locations at which conduit 12 is mounted to support 10, at crossing location 25. The conduit is vibrated by a linear electromagnetic driver, 24, having a stator, 26, attached to the support 10, and a movable armature, 28, attached to the return leg 22 through a driving rod, 30. For symmetry, rod 30 is shown to be attached at the center of return leg 22 by coupling, 32. The vibration driver 24 can be of the moving coil type, similar to loudspeaker drivers, or of the solenoid type with a movable magnetic core. Vibration driver 24 is energized by alternating current at the frequency of vibration from an amplitude-regulated drive circuit, not shown. Vibration of the S-shaped conduit 12 by driver 24 produces an increasing gradient of transverse velocity in the direction of vibration between the inlet 16 and the midpoint of the conduit at coupling 32 and a decreasing gradient of transverse velocity in the direction of vibration between the midpoint and the outlet 20. Force couples due to change in transverse momentum caused by the mass of material flowing through the conduit will exist about a longitudinal axis through return leg 22 and a lateral axis passing through the midpoint at coupling 32 perpendicular to the longitudinal axis and also perpendicular to the direction of vibration. Since an objective of the S-shaped conduit is to minimize the lateral dimension of the meter, the moment arm about the longitudinal axis should be relatively small, but the moment arm about the lateral axis can be made relatively large by increasing the length of the return leg 22. Therefore, the force couple of interest is that about the lateral axis. The force couple can be sensed directly by mounting the ends of conduit 12 in load sensors, such as piezoelectric elements and measuring the differential output. Alternatively, vibration sensors such as velocity sensors or accelerometers can be mounted at points on opposite sides of and equidistant from the mid-point of leg 22 and their outputs processed and compared to provide a differential related to mass flow rate. If the ends of the conduit at the inlet and outlet are built into the support and fixed, displacement-sensitive devices can be used as the vibration sensors to measure the differential deflection of the conduit at the sensing points.

It should be understood that for a conduit with built-in ends the transverse acceleration of the flowing mass within the conduit will cause a differential deflection on opposite sides of the mid-point. If the mass of material flows through the conduit from the inlet 16 to the outlet 20, the transverse deflection of the conduit between the inlet and the mid-point will lag the deflection of the conduit between the mid-point and the outlet in both directions. This is because spatial acceleration of the mass flowing from the inlet to the mid-point produces a force opposite to the direction of vibratory motion, and spatial deceleration of the mass flowing from the mid-point to the outlet produces a force in the same direction as the direction of vibration. The displacement sensors should be located at optimum positions where the differential deflection is greatest. This should be within the bends 15 and 17 joining the return leg 22 to the inlet leg 14 and outlet leg 18 of conduit 12.

Suitable displacement sensing means can be of the analog or digital type. If analog sensors are used, the phase difference of the sensed vibrations can be used to measure the differential deflection. Typical of a non-contacting displacement sensor is the Micro Switch (Division of Honeywell) No. 9 SS linear output Hall effect transducer. Digital displacement sensing means can use switches to detect passage of the inlet and outlet deflection points past a reference position. The lead (outlet) switch starts a timer, the lagging (inlet) switch causes the time to stop. The elapsed time is a measure of the differential conduit deflection due to vibration of the mass flow. Typical of suitable non-contacting switches are a Micro Switch No. 8SS Hall effect magnetically operated position sensor, a Clairex No. CL1-305 LED Phototransistor pair optical switch, and a No. 30965 Wiegand effect non-contact limit switch supplied by Sensor Engineering Co. of Hamden, Conn.

FIG. 2A illustrates a displacement sensor, 34, at the outlet sensing position, typical of an optical switch. Housing, 36, attached to the support contains the optical pair. Vane 38 attached to conduit 12 contains a tiny hole which interrupts the light beam between the optical elements. The outlet displacement sensor shown in FIG. 2B is identical. The configuration of sensor 34 can also be typical of Hall effect and Wiegand wire switches.

The foregoing is illustrative of the mechanical construction required to use a vibrated S-shaped conduit for the measurement of mass flow. Electrical driving circuits and sensor output circuits for load cells, vibration pickups and displacement sensors are adequately described in the prior art cited and applicable to this invention.

Figure 3:
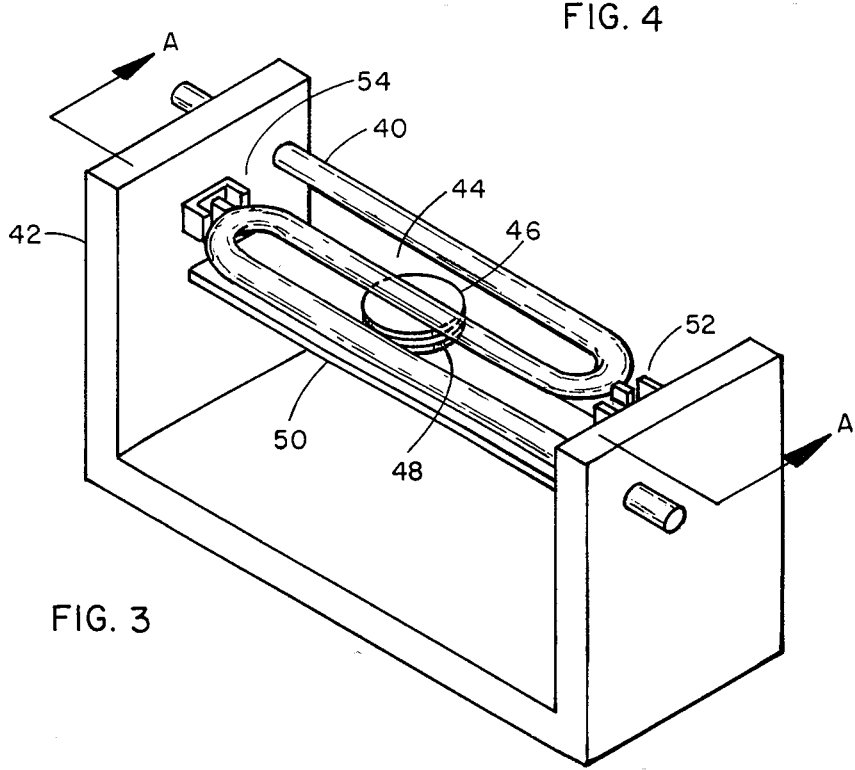
FIG. 3 is an illustration of another preferred embodiment of the invention, showing use of a bucking beam to minimize vibration transmission to the support.

FIG. 3 shows another embodiment of the invention in which a bucking beam having the same dynamo-elastic properties as an S-shaped conduit 40 is built into a support 42 and is vibrated 180 degrees out of phase with conduit 40 to minimize transmission of vibratory forces to support 42. One reactive part, 46, of an electromagnetic driver, 44, is attached to conduit 40 and the cooperating reactive part, 48, is attached to the beam, 50. Inlet displacement sensor, 52, and outlet displacement sensor, 54, detect the deflection of conduit 40 with respect to support 42 at their sensing points.

Figure 5:
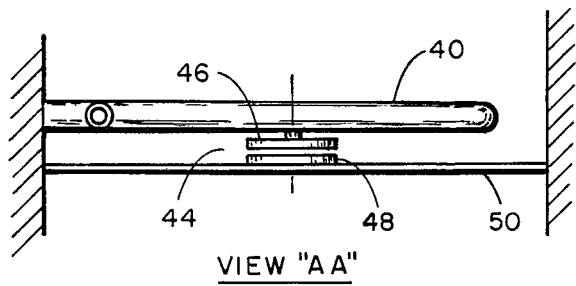
FIG. 5 is a sectional view of the structure shown in FIG. 3.

FIGS. 4 and 5 are other views to more clearly illustrate the embodiment of FIG. 3.

Figure 6:
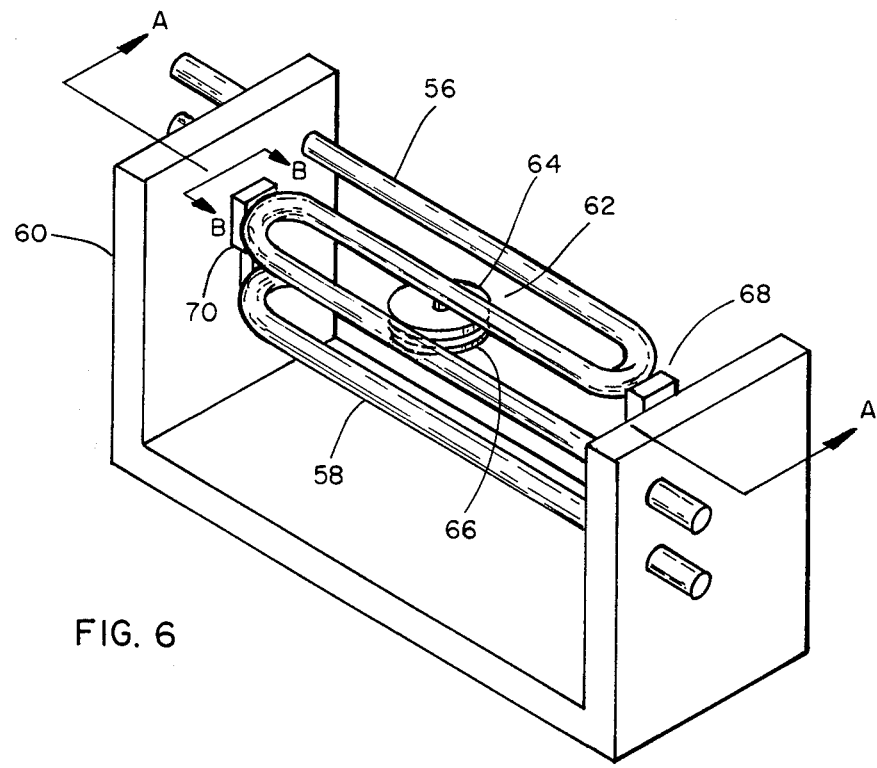
FIG. 6 shows a third preferred embodiment in which two identical S-shaped conduits are used, and the output is related to the sum of the mass flow rates through the two conduits.

A third embodiment, in which two identical and parallel S-shaped conduits 56 and 58 are vibrated 180 degrees out of phase with each other, is shown in FIG. 6. The inlet and outlet displacements of conduits 56 and 58 with respect to each other are sensed, and the differential output is a measure of the total rate of mass flows in both conduits 56 and 58. S-shaped conduit, 56, and S-shaped conduit, 58, are built into support, 60, in a parallel arrangement. Electromagnetic driver, 62, has one reactive part, 64, attached to conduit, 56, and another reactive part, 66, attached to conduit 58. Displacement sensor, 68, measures the relative deflections of the two conduits at the inlet sensing point and displacement sensor, 70, measures the relative deflections of the conduits 56 and 58 at the outlet sensing point.

Figure 8:
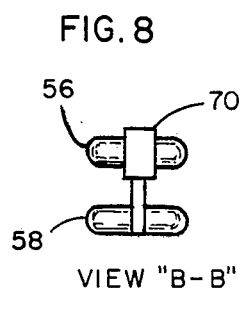
FIG. 8 is a view of a vibration sensor in the arrangement of FIG. 6.
Figure 7:
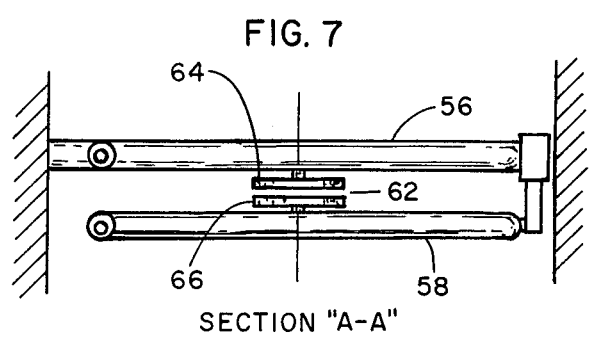
FIG. 7 is a sectional view of the structure shown in FIG. 6.

FIGS. 7 and 8 more clearly illustrate the embodiment of FIG. 6.

If the two conduits, 56 and 58, of FIG. 6 are filled with the same material or with materials of the same densities, then the total vibrational forces will be the same, and the vibratory force transmission to support 60 will be minimal. The embodiment of FIG. 6 is advantageous for measuring the flow in a single line, which may be split into two approximately equal flows, passed through S-shaped conduits 56 and 58 and subsequently recombined when returned to the line. The sizes of conduits 56 and 58 will be reduced, providing greater flexibility, less driving power and more compact construction. The arrangement of FIG. 6 is also useful to measure the combined flows of two separate streams.

Figure 9:
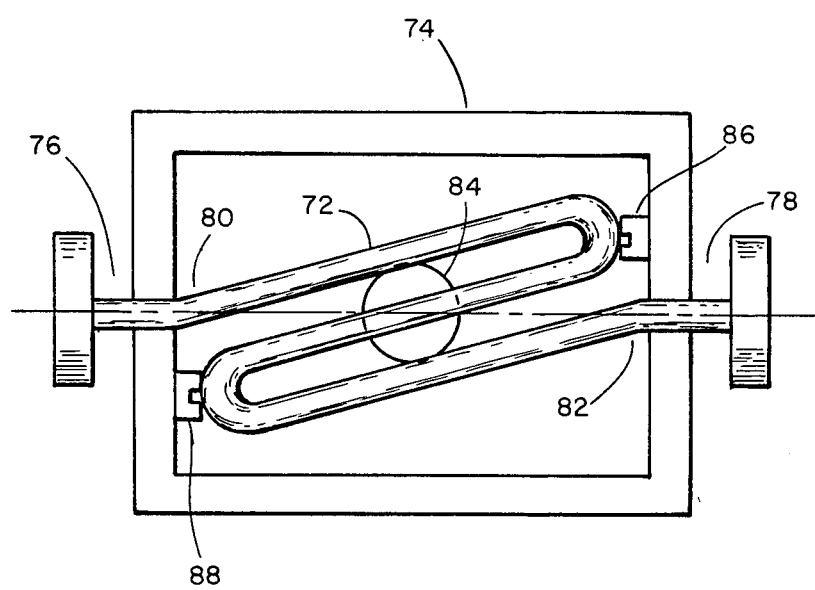
FIG. 9 shows an arrangement where the S-shaped conduit is connected in a housing with coaxial inlet and outlet ports.

FIG. 9 illustrates one major improvement provided by the S-shaped conduit, namely, the ability to accomplish the vibratory mass flow measurement with a unit that can be installed directly into a line. S-shaped conduit, 72, is assembled into a housing, 74, having an inlet port, 76, that is coaxial with an outlet port, 78. The longitudinal axis of the S-shaped conduit, 72, is at an angle with the port axis so that the inlet, 80, of conduit 72 can be connected to outlet port 76 and the outlet, 82, of conduit 72 can be connected to outlet port 78. The S-shaped conduit 72 is vibrated with respect to housing 74 by electromagnetic driver, 84, and the inlet and outlet deflections of conduit 72 with respect to housing 74 are detected by displacement sensors, 86 and 88, respectively.

What is claimed is:

1. A dynamic vibratory meter for measuring the mass of material flowing therethrough, including,
    an S-shaped conduit, with a longitudinal axis, having three co-planar legs, an inlet leg with its inlet end connected to a support, an outlet leg with its outlet end connected to the support, and a return leg, connecting the inlet and outlet legs,
    means to vibrate the conduit in a direction transverse to the plane of the three legs, providing an increasing gradient of transverse velocity, and, therefore, transverse momentum of the flowing material, between the inlet and a maximum velocity point along the return leg, and providing a decreasing gradient of transverse velocity, and, therefore, transverse momentum of the flowing material, between the maximum point and the outlet, and
    means for sensing the vibratory force couple on the conduit about an axis perpendicular to the direction of vibration due to the transverse momentum as a measure of the mass flow through the conduit.

2. A meter as claimed in claim 1 in which the vibratory force couple sensing means includes two vibration sensors on opposite sides of the maximum velocity point, and the difference in outputs of the two sensors provides a measure of mass flow rate.

3. A meter as claimed in claim 2 in which the conduit is built into the support and flexes in response to the vibratory forces and the vibration sensors sense the vibratory displacements of the conduit.

4. A meter as claimed in claim 3 in which the displacement sensors are optical switches and the elasped time interval between switching of the two sensors is used as the differential output.

5. A meter as claimed in claim 1 in which the vibrating means is a linear electromagnetic driver, with a stator attached to the support and a movable armature attached to the return leg of the conduit.

6. A meter as claimed in claim 1 in which the vibrating means is a linear electromagnetic driver with one reactive part attached to the return leg of the conduit and the other reactive part attached to a beam, which is built into the support and has the same dynamo-elastic properties as the conduit to minimize transmission of vibrations to the support.

7. A meter as claimed in claim 1, including a second S-shaped conduit identical with the first conduit and parallel to it, in which the vibrating means is a linear electromagnetic driver with a reactive part attached to the return leg of each conduit, and the vibratory force couple sensing means includes two vibration sensors on either side of the driver to measure the differential motions between the two conduits and to provide an output which is related to the sum of the mass flow rates through the two conduits.

8. A meter as claimed in claim 1 in which the support is a housing with coaxial inlet and outlet ports and the S-shaped conduit is disposed within the housing with its longitudinal axis at an angle with the port axis.

9. A meter for measuring the mass flow rate of material travelling through said meter comprising:
   a support;
   a conduit having a first inlet section that defines an inlet connected to said support and an outlet, a second outlet section that defines an outlet connected to said support and an inlet, and a third section that joins said outlet of said first section to said inlet of said second section, said conduit including a first bend, at the juncture of said first and third sections, that causes a fluid stream flowing through said conduit to make a turn in a first direction, and a second bend, at the juncture of said second and third sections, that causes the fluid stream to make a turn in a second different direction;
   means for vibrating said conduit in a direction transverse to the longitudinal axis of said third section to provide an increasing gradient of transverse velocity of the flowing material between said first section inlet and said first section outlet, and, therefore, to produce a transverse force gradient on said conduit in a first direction, and to provide a decreasing gradient of transverse velocity of the flowing material between said second section inlet and said second section outlet, and, therefore, to produce a transverse force gradient on said conduit in a second direction; and
   means for sensing the effect of the vibratory force couple exerted on the conduit about an axis that is perpendicular to the direction of vibration due to said transverse force gradients.

10. A meter for measuring the mass flow rate of material travelling through said meter comprising:
    a support;
    a conduit that defines an inlet and an outlet, said inlet and said outlet being mounted to said support, said conduit crossing a line joining the locations at which said conduit is mounted to said support;
    means for exerting a driving force against said conduit to vibrate said conduit in a direction that is transverse to the direction of fluid flow through said conduit at the location at which said driving force is exerted against said conduit, to provide an increasing gradient of velocity of the flowing material in said transverse direction between said inlet and a predetermined location on said conduit and, therefore, to produce a transversely directed force gradient on said conduit in a first direction, and to provide a decreasing gradient of transversely directed velocity of the flowing material between a predetermined location on said conduit and said outlet and, therefore, to produce a transversely directed force gradient on said conduit in a second direction; and
    means for sensing the effect of the vibratory force couple exerted on the conduit about an axis that is perpendicular to the direction of vibration due to said transverse force gradients.

11. The meter recited by claim 10 wherein said predetermined locations are the same location.

12. The meter recited by claim 10 wherein said crossing location is located substantially midway between said mounting locations.

* * * * *